Dec. 12, 1972 J. R. REINERT 3,706,043

SYNCHRONOUS PARALLEL COUNTER WITH COMMON STEERING OF CLOCK PULSES TO BINARY STAGES

Filed Sept. 30, 1971 2 Sheets-Sheet 1

3,706,043

SYNCHRONOUS PARALLEL COUNTER WITH COMMON STEERING OF CLOCK PULSES TO BINARY STAGES

John R. Reinert, Tempe, Ariz., assignor to Motorola, Inc., Franklin Park, Ill.

Filed Sept. 30, 1971, Ser. No. 185,179
Int. Cl. H03k *21/16*
U.S. Cl. 328—42 10 Claims

ABSTRACT OF THE DISCLOSURE

Parallel counter constructed as an integrated circuit with a plurality of pairs of NAND gates forming binary stages, and a steering circuit including input NAND gates associated with the binary stages. The steering circuit includes couplings from the outputs of the binary stages to the inputs of the higher order input NAND gate, and also couplings from the outputs of the input NAND gates to reset inputs of the lower order binary stages. The clock pulses may or may not be periodic and may have different pulse durations, and an input circuit coupled to all of the input NAND gates disables the same at a predetermined time after the beginning of each clock pulse. A reset gate is coupled to the reset input of the highest order binary stage to reset the counter at the desired count.

BACKGROUND OF THE INVENTION

The invention relates to binary counters of the synchronous parallel type, and more particularly to a steering circuit for applying pulses to be counted to the binary stages of the counter.

Binary counters having stages which are operated in parallel are known and have the advantage that the stages operate simultaneously to provide fast action. In such counters, it is necessary to provide a steering circuit for applying the pulses to the counter stages to provide the desired counting action. The steering circuits which have been used, have been quite complex, requiring a large number of gates of different types to selectively apply the pulses to the binary stages.

In order to conserve space and to provide inexpensive construction, it is desired to construct the counters in integrated circuit form. It is therefore desired to provide a minimum number of elements and a minimum of different circuit configurations, so that the various stages can be easily laid out on the semiconductor chip and constructed by relatively simple processing techniques.

SUMMARY OF THE INVENTION

It is an object of the present invention to provide an improved binary counter of the parallel synchronous counter type.

Another object of the invention is to provide a common steering circuit for a parallel synchronous counter which utilizes, a minimum number of circuit elements, such as gates.

A further object of the invention is to provide a synchronous counter suitable for construction as an integrated circuit, which includes a plurality of circuit elements all of which can be of the same configuration, thereby simplifying the construction.

In practicing the invention, a counter of the synchronous parallel type includes a plurality of binary stages which count clock pulses applied thereto. The clock pulses are applied from a clock input to input NAND gates which are individually associated with the binary stages, each of which includes two NAND gates. An input circuit which also receives the clock pulses applies an enabling pulse to the input NAND gates for a predetermined time period after the start of each clock pulse to provide the counting operation. The input circuit removes the enabling pulse to disable the NAND gates after the predetermined time period, thereby permitting operation of the counter from clock pulses which may or may not be periodic and of constant duration. The input NAND gates and the coupling between these gates and the binary stages form a steering circuit, with the clock pulses being simultaneously applied to the input gates with enabling voltages from the lower order binary stages. The outputs from each of the input NAND gates are applied to set the associated binary stage, and also to reset the lower order binary stages. A reset NAND gate receives clock pulses, enabling pulses from the input circuit, and also the voltage from predetermined binary stages, and is coupled to reset the highest order binary stage and one or more other binary stages to reset the counter at the desired count.

BRIEF DESCRIPTION OF THE DRAWINGS

FIG. 2 is a timing diagram illustrating the operation of the system of FIG. 1;

DESCRIPTION OF THE PREFERRED EMBODIMENT

Figures 1, 3, 4:
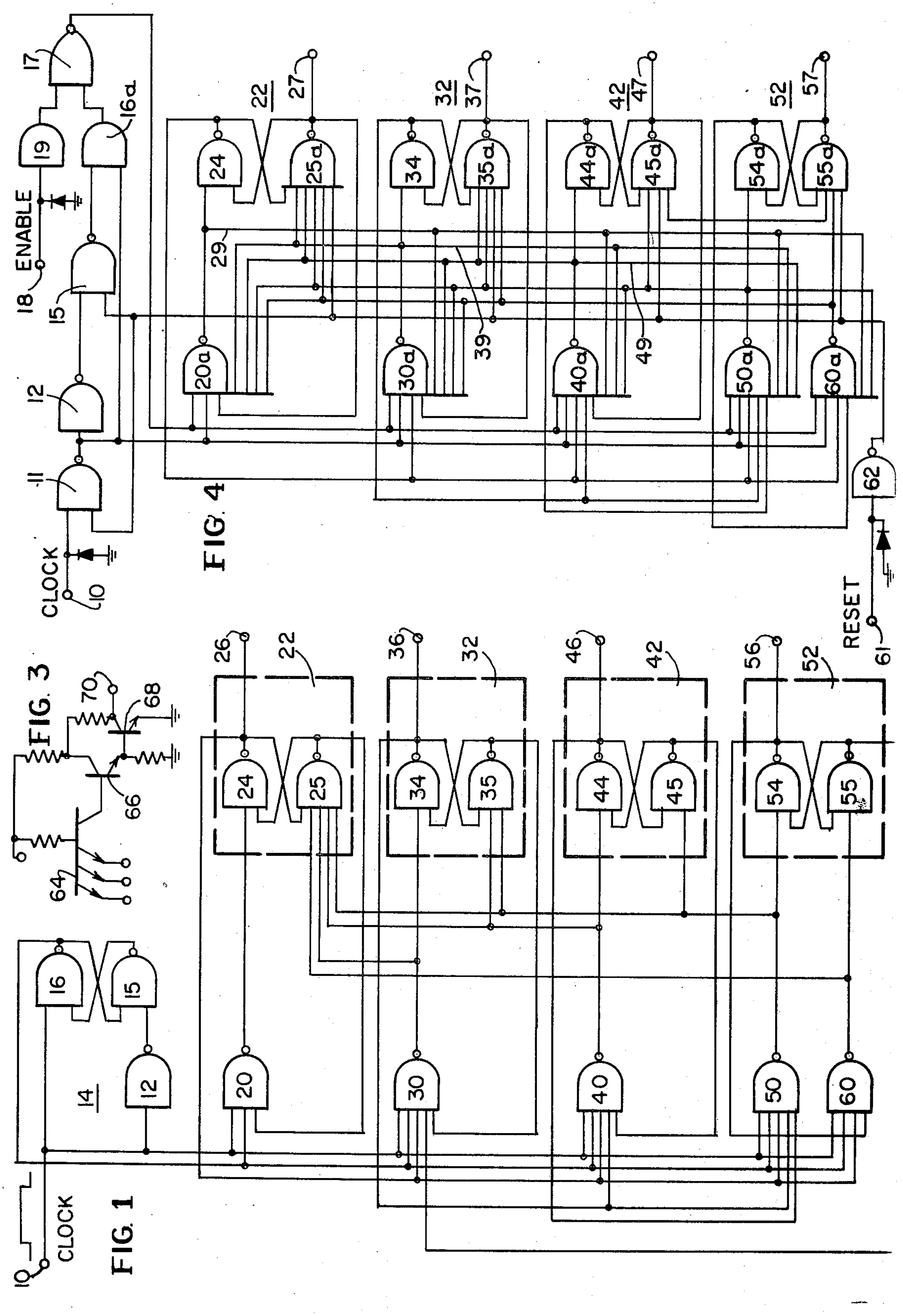
FIG. 1 is a block diagram of one embodiment of the counter of the invention.
FIG. 3 illustrates a NAND gate circuit which can be used in the system of FIG. 1.
FIG. 4 is a block diagram of a counter of the invention which has certain advantages over the system of FIG. 1.

Referring now to the drawings, in FIG. 1 there is shown one embodiment of the counter circuit of the invention. Clock pulses are applied at input terminal 10, and are coupled to NAND gate 12 of the input circuit 14, and to input NAND gates 20, 30, 40 and 50 which are coupled to the binary stages 22, 32, 42 and 52, respectively. The input stage 14 includes, in addition to the NAND gate 12, two additional NAND gates 15 and 16. The NAND gate 12 has a single input and provides an inversion of the input pulse with one gate delay. The NAND gate 15 is shown having two inputs, but may have only a single input coupled to the output of the NAND gate 12. The NAND gate 16 requires two inputs, one for the clock pulses from terminal 10, and one for the output pulse from NAND gate 15. The coupling from the output of NAND gate 16 to the second input of NAND gate 15 is optional and may be omitted.

Input NAND gate 20 coupled to the first binary stage 22 has three inputs, the first receiving the clock pulse from terminal 10, the second receiving the voltage at the output of NAND gate circuit 16 of the input circuit 14, and the third coupled to the output of reset stage 25 of the binary stage 22. The binary stage 22 is formed by NAND gate 24 which provides the set output, and NAND gate 25 which acts to reset gate 24. The output of the binary stage 22 is coupled to the binary output terminal 26. The NAND gate 24 of the binary stage 22 has two inputs, the first from the input NAND gate 20 and the second from the reset NAND gate 25. The reset NAND gate 25 has five inputs, the first being coupled to the output of NAND gate 24, one from each of the higher order input NAND gates 30, 40 and 50, and one from reset NAND gate 60.

The input NAND gate 30 coupled to the second binary stage 32 has five inputs, with the first two connected to the clock input from terminal 10 and to the output of the input circuit 14. These two inputs are applied to all of the input NAND gates 20, 30, 40 and 50, as well as to the reset gate 60. NAND gate 30 also has inputs from the output of binary stage 22, from its own reset stage 35, and from reset stage 55 of the binary stage 52. The binary stage 32, like binary stages 22, 42 and 52 has two NAND gates 34 and 35. Gate 34 has two inputs, one from the associated input NAND gate 30 and one from the reset NAND gate 35. The output of NAND gate 34 is applied to binary output terminal 36. The reset NAND gate 35 of binary stage 32 has three inputs, the first from the NAND gate 34, and the second and third from the two higher order input NAND gates 40 and 50.

Input NAND gate 40 has five inputs, the first two being common to all the input gates. An input is also applied from the reset gate 45 of the associated binary stage 42, and from the outputs of the lower order binary stages 22 and 32, which are the same outputs provided to the binary output terminals 26 and 36. NAND gate 44 of binary stage 42 has two outputs, from its associated input NAND gate 40 and from the reset NAND gate 45 of the binary stage 42, the same as described for the preceding stages. NAND gate 45 has only two inputs, one from NAND gate 44, and the second from the single higher order input NAND gate 50.

Input NAND gate 50 has five inputs, the two which are common to all the input NAND gates, and three other inputs which are the binary outputs of the lower order binary stages 22, 32 and 42. These are the binary outputs which are applied to output terminals 26, 36 and 46 of the counter. The binary stage 52 includes NAND gates 54 and 55, with the NAND gate 54 having inputs from the associated input NAND gate 50 and from the other reset gate 55. The output from NAND gate 54 is applied to the output terminal 56. The reset NAND gate 55 of stage 52 also has two inputs, one from the NAND gate 54 and the second from the reset gate 60.

Reset gate 60 has four inputs, two of which are from the clock terminal 10 and the input circuit 14, being the same as applied to the input NAND gates 20, 30, 40 and 50. The other two inputs to reset gate 60 are from the binary stages 22 and 52. These two inputs are selected depending upon the desired count to be made by the counter, with the connections shown providing decimal counting whereby the counter counts clock pulses 1 through 9, and then resets on the tenth clock pulse. In the normal binary sequence, the fourth binary stage 52 will be operated on the eighth count and will remain operated during the ninth count, and will then be reset on the tenth count since both binary stages 22 and 52 will be operated.

Considering now the operation of the circuit, the clock pulse goes high at the beginning of the pulse as is shown by *a* in line 10 of FIG. 2. This rise of the clock pulse is the part which is counted by the circuit. As is well known, the NAND gates normally have a high output, and require a high input at all inputs to produce a low output The normal AND gate has a low output, and requires a high input at each of its inputs to provide a high output at its output. However, a NAND gate such as used in the circuit described includes an inverter at its output, so that its output is normally high rather than low, and with all inputs high the inverted output is low rather than high.

All of the NAND gates, including the ones forming the binary stages, can be of the same configuration, except for the number of inputs required. FIG. 3 shows a circuit configuration which can be used, which includes transistor 64 including a plurality of emitters to which the inputs of the NAND gate are coupled. The base of transistor 64 is connected to the supply by a resistor, and the collector is connected to the base of transistor 66. Transistors 66 and 68 form an inverter with transistor 68 being selectively rendered conductive to connect output terminal 70 to ground for the low output, or to the supply potential for the high output. When all the inputs at the emitters of transistor 64 are high, the potential at the collector is high and acts to render transistors 66 and 68 conducting so that the output terminal 70 is at ground (low output). When any one or more of the emitters of transistor 64 is low, the voltage at the collector drops to turn off transistors 66 and 68, so that the output terminal rises to the supply potential (high output).

When the first clock pulse is received, the high inputs applied to gates 12 and 20 actuate the same to provide low outputs. Gate 12 has a single input so only one high input is required to actuate the same to provide a low output. The low output of gate 12 is applied to gate 15 so that its output goes high. The clock input applied to gate 16 will not operate this gate as its other input remains low. When the output from gate 15 goes high during the clock pulse, gate 16 will have two high inputs so that its output will go low. This will act to disable gate 20 and to provide a low input to the other gates to which it is coupled.

FIG. 2 is a timing diagram illustrating the operation of the gates of the input circuit 14, and of the gates forming the binary stages and the input stages. The lines shown in FIG. 2 are numbered to correspond to the gates which produce the outputs indicated by the lines. It is noted that the outputs of gates 12 and 16 are initially high, and the output of gate 15 is initially low. When the clock pulse 10 goes positive at time *a*, it will operate gates 12 and 20 as previously described so that they will shift from a high output to a low output. This takes place at time *b*, being one gate delay after the rise of the clock pulse. The low output from gate 12 applied to gate 15 and causes its output to go high. This takes place at time *c*, which is one additional gate delay after time *b*. The high output from gate 15 together with the high clock output causes the output of gate 16 to go low. This takes place at time *d*, which is a third gate delay after the clock pulse rises. This low input to gate 20 at time *d* disables this NAND gate.

Considering the operation of input gate 20 coupled to binary stage 22, the output of this gate is initially high. At the time the clock pulse is applied to gate 20, the output from gate 16 of input circuit 14 is high, and the output from gate 25 of the binary stage 22 is also high (FIG. 2). Accordingly, gate 20 has three high inputs so that it will produce a low output at time *b*. The low output from gate 20 is applied to gate 24 and will disable this gate to provide a high output therefrom at time *c*. This high output is applied to binary output terminal 26, and is also applied to one input of input gates 30, 40 and 50 and reset gate 60, as will be described. Accordingly, the first clock pulse will actuate the binary counter 22 to provide a high output at terminal 26, which indicates a count of one. The outputs of the other binary stages 32, 42 and 52 will all be low at this time, as will be described.

The reset NAND gate 25 of binary stage 22 will be operated when the output of gate 24 goes high, as all of its other inputs will likewise be high. This produces a low output at reset gate 25 which is applied to gate 24 to hold the same latched in the disabled stage, so that its output 26 remains high. The low output from gate 25 is also applied to input NAND gate 20 to disable the same, this low output occurring at the same time the low output from gate 16 of the input circuit is applied to gate 20.

Considering the action of input gate 30 to the first clock pulse, the first two inputs from the clock input 10 and the input circuit 14 will go high, as has been described. The third input from the output of binary stage 22 will be low, but will go high after gate 24 operates. The other two inputs to gate 30 will also be high so that the input gate 30 will operate at time *d*, one gate delay after the binary stage 22 operates. However, as gate 30 operates, the NAND gate 16 of the input circuit 14 will act to remove the enabling (high) input to input NAND gate 30 (as well as to the other input NAND gates). Accordingly, the NAND gate 30 will produce a low output for only a short time interval, and this will not normally be sufficient to cause an unwanted state change. The other input gates 40 and 50 will not receive the required enabling pulse from stage 32, so they will not operate in response to the first clock pulse.

The output at binary terminal 26 will therefore be high, and the output at the other binary terminals 36, 46 and 56 will be low in response to the first clock pulse. The termination of the first clock pulse will cause input gate 12 to go back to a high output. Gate 16 will also go to a high output when the clock pulse is removed. Gate 15 of the output circuit will go to a low output one gate delay after gate 12 switches to a high output.

When the second clock pulse is received at time *e*, the input circuit including gates 12, 15 and 16 will operate in the same manner as described in response to the first clock pulse. The clock pulse will not operate gate 20 inasmuch as binary stage 22 is set and a low input is applied to one input of gate 20 from gate 25, the reset gate of the bistable stage 22. The clock output will operate input NAND gate 30, which is coupled to the second binary stage 32. Accordingly, gate 30 will operate at time *f*, which is one gate delay after the clock input goes high. This will cause NAND gate 34 of the binary stage 32 to operate at time *g*, a second gate delay after the clock pulse goes high (FIG. 2). This will produce a high output at binary output terminal 36, whtich represents a count of two.

The low output from input NAND gate 30 is coupled to the reset gate 25 of the first binary stage 22. This provides a high input to stage 24 to reset stage 22 and provide a low output at the binary output terminal 26. The high output from gate 25 which is applied to input NAND gate 20 provides all high inputs for this gate so that it produces a low output at time *h*. This output is produced at the same time that gate 16 of the input circuit goes low to disable the input gates. Accordingly, the output pulse produced by gate 20 in response to the second clock pulse will be of short duration, as was the output pulse of gate 30 for the first clock pulse, as previously described.

Input gate 40 associated with the next binary stage 42 will also provide a short duration pulse at time *h*, following the application of the high output from binary stage 32 thereto. However, at this same time the high output of gate 16 of the input circuit 14 will drop, so that the output of stage 40 will be low only for a single gate delay.

The third clock pulse will operate the input circuit 14 in the same manner as the first and second clock pulses. Input NAND gate 20 will also respond in the same way as to the first clock pulse to operate the NAND gate 24 of the binary stage 22. It will be noted that binary stage 32 remains operated and there is no coupling to reset the binary stage 32 by the output of input gate 20. Accordingly, when the third clock pulse is received, binary outputs will be present at output terminal 26 and 36 to provide the normal binary output for a count of three.

When the fourth clock pulse is received, this will operate the input stage 14 in the manner previously described. The clock pulse cannot operate gate 20 as it receives a low output from gate 25 of the binary stage 22 which is operated. Similarly, the clock pulse cannot operate input gate 30 since it receives a low output from the gate 35 of the operated binary stage 32. The input NAND gate 40 will operate since it is enabled by the binary stages 22 and 32, and is not disabled by binary stage 42 connected thereto. This will cause NAND gate 44 of the binary stage 42 to operate and produce a high output at the binary output terminal 46. The output of input NAND gate 40 is also applied to reset gates 25 and 35 of binary stages 22 and 32. This will reset the binary stages 22 and 32 so that the outputs at terminals 26 and 36 will drop to the low value. Accordingly, only output 46 will remain at the high value to provide the binary output for a count of four. The fourth clock pulse will operate the input NAND gate 50 for a very short time because it will be enabled by the AND gate 44 of binary stage 42. Also, input gates 20 and 30 will be operated when stages 22 and 32 are reset. However, as previously described, the output of NAND gate 16 of the input circuit 14 will immediately drop to disable NAND gates 20, 30 and 50 to terminate the outputs therefrom before an unwanted state change is produced. The operation of the gates in response to the fourth clock pulse is shown in FIG. 2.

The fifth clock pulse will operate binary stage 22 in the same manner it was operated by the first and third clock pulses. Binary stage 42 will remain operated so that the fifth clock pulse will cause outputs at terminals 26 and 46. This operation is also shown in FIG. 2.

The sixth clock pulse will operate binary stage 32 in the same manner it was operated by the second clock pulse. The output from the input gate 30 will disable binary stage 22 so that the potential at terminal 26 goes low. The output at terminal 46 remains high. Accordingly, for the sixth clock pulse outputs will be provided at output terminals 36 and 46. The seventh clock pulse will again actuate binary stage 22 and this does not reset binary stages 32 and 42, so that for a count of seven, high outputs will be provided at the three binary output terminals 26, 36 and 46.

The eighh clock pulse will come in when binary stages 22, 32 and 42 are all operated. Each of these stages provides a disabling low input to the associated input gate (20, 30 and 40) so that these gates cannot respond to the eighth clock pulse. Gate 50, however, will respond to the eighth clock pulse and will actuate the NAND gate 54 of the binary stage 52 to produce a high output at terminal 56. The output from NAND gate 50 is applied to reset gates 25, 35 and 45 of the binary stages 22, 32 and 42 to reset these three stages. After stages 22, 32 and 42 are reset, input gates 20, 30 and 40 associated therewith will provide short duration outputs which are terminated by the application of a low input to these gates from gate 16 of the input circuit 14. Accordingly, the eighth clock pulse will produce an output only at terminal 56 of the fourth binary stage, which is the usual binary output for a count of eight. This action is illustrated in FIG. 2.

The ninth clock pulse received will actuate the input gate 20 to set the binary stage 22 in the same manner as for a count of one. Stage 52 remains set, so that outputs are provided at terminals 26 and 56.

The reset NAND gate 60 will be enabled when the tenth clock pulse is received, as the outputs of binary stages 22 and 52, which are coupled to this gate, are high. The input from gate 16 of the input circuit will also be high at a time three gate delays after the start of the ninth clock pulse. Then, when the tenth clock pulse comes in, all inputs to gate 60 are high and the reset gate will be operated to reset stages 22 and 52. All binary outputs 26, 36, 46 and 56 will then be low as at the start of the count. Input gate 30 for binary stage 32 receives a high input from stage 22 after the ninth pulse, but the input from reset gate 55 of binary stage 52 will be low so that gate 30 will not respond to the tenth pulse.

FIG. 4 shows a modification of the circuit of F'G. 1 which has additional connections between the NAND gates to eliminate the short undesired pulses referred to in connection with FIG. 1, and shown in the timing diagram of FIG. 2. Input clock pulses from terminal 10 are applied through an additional NAND gate 11 to the NAND gate 12 of the input circuit 14*a*, and to the input NAND gate 20*a*, 30*a*, 40*a* and 50*a* coupled to the binary counter stages. Because of the inversion provided by the NAND gate 11, the system will respond to the clock pulse going low, rather than high as in the system of FIG. 1. The input circuit 14*a* includes NAND gates 12 and 15, which may be the same as in FIG. 1. An AND gate 16*a* replaces the NAND gate 16 in FIG. 1, with the output being applied through NOR gate 17 to the inputs of the input NAND gates 20*a*, 30*a*, 40*a* and 50*a*.

A further terminal 18 is provided for an enable pulse which is applied through AND gate 19 to the NOR gate 17. The enabling circuitry permits the counter to be disabled by an input applied at terminal 18. The potential applied at terminal 18 is passed through gate 19 to the NOR gate 17, to provide a low input to all of the stages 20*a*, 30*a*, 40*a* and 50*a* to disable the same. The counter is thereby disabled until the output at terminal 18 is removed.

Input NAND gates 20*a*, 30*a*, 40*a* and 50*a* have all of the same connections as in FIG. 1, and have additional inputs which are used in a feedback circuit which will be described. The binary stages 22, 32, 42 and 52 are similar to the stages in FIG. 1, except that some of the NAND gates thereof include additional inputs. NAND gates 24 and 34 forming the set gates of binary stages 22 and 32 have only two inputs as in FIG. 1, but all of the other NAND gates have additional inputs. In FIG. 4, the outputs are taken from the reset gates which are connected to terminals 27, 37, 47 and 57. Accordingly, the outputs will normally be high, and when any stage is operated, the output will become low. This inversion does not have significance in the operation of the counter.

In response to the first pulse, input NAND gate 20*a* will operate to provide the same operations described in connection with FIG. 1. In addition, an output is applied from input NAND gate 20*a* through conductor 29 to an input of NAND gate 30*a* associated with the second binary stage 32. This will prevent the operation of NAND gate 30*a* when the pulse from set gate 24 of binary stage 22 is applied thereto. This eliminates the pulse shown in FIG. 2 under the one count, and marked *x*. It will be noted that this pulse occurs during the time NAND gate 20 is operated, so that by providing feedback from NAND gate 20*a* to NAND gate 30*a* in FIG. 4, this pulse will be eliminated. The feedback connection from NAND gate 20*a* provided by conductor 29 also goes to inputs of NAND gates 40*a*, 50*a* and 60*a*, so that all of these NAND gates will be disabled during the operation of NAND gate 20*a*.

A similar feedback connection is provided from the output of NAND gate 30*a* which is connected through conductor 39. This extends to an input of NAND gate 20*a* to prevent operation of this NAND gate after binary stage 22 is reset by the action of input NAND gate 30*a*. The pulse which occurs in the system of FIG. 1 is shown under the second clock pulse in FIG. 2 and identified as *y*. This occurs during the time gate 30 is operated so it is eliminated by the feedback connection from gate 30*a* to the input of gate 20*a*. Conductor 39 from input gate 30*a* is also coupled to reset gate 25 of binary stage 22, as in FIG. 1.

Input NAND gates 40*a* and 50*a* are also connected by conductors 49 and 59, respectively, to the other input NAND gates to prevent the short undesired outputs of these NAND gates resulting from their being enabled one gate delay prior to the disabling pulse from the input circuit 14*a*. Since each of these outputs occurs during the operated period of the desired input NAND gate, the feedback connections shown are effective to remove the undesired pulses. This is clear from FIG. 2 when considering the operation in response to the fourth clock pulse, wherein the pulses *z* are produced by the gates 20, 30 and 50 during the period of operation of gate 40. These pulses are eliminated by the feedback connections.

The feedback connection from NAND gate 55 to input NAND gate 30 shown in FIG. 1, which inhibits gate 30 during the tenth clock pulse, is not used in the circuit of FIG. 4. The inhibiting action in this circuit is provided by a feedback connection from reset gate 60*a*, which operates during the tenth clock pulse, to input NAND gate 30*a* and gate 35*a* of binary stage 32.

The circuit of FIG. 4 has a further feature provided by an additional reset gate 62. This responds to an input applied at terminal 61 and acts to reset all the counter stages. It will be noted that the output of NAND gate 62 is applied to inputs of gates 11 and 15 of the input circuit 14*a* to disable the same so that input pulses will not be applied during the resetting operation. The reset circuit can be coupled to the binary stages to reset the same at a number other than zero if this is desired. Also, connections between the input gates and the gates of the binary stages can be provided so that the counter counts to some number other than ten, a count of sixteen being possible with the four binary stages shown.

The counter circuit of the invention provides fast counting action by use of a relatively simple structure which can be constructed in integrated circuit form. The input circuit makes it possible to count pulses having different durations and occurring at different rates. The counter circuit is formed by NAND gates which may all be alike, to thereby simplify the construction. The number of gates required for steering is significantly less than in prior circuits so that the resulting structure can be compact and inexpensive.

I claim:

1. A counter circuit for counting clock pulses and providing a binary output including in combination:
- a plurality of binary stages arranged in sequence from the lowest order to the highest order stage, each of said binary stages having a set input, reset input means, a binary output and a reset output;
- a plurality of input NAND gates individually associated with said binary stages and each having a plurality of inputs and an output coupled to said set input of the associated binary stage;
- clock input means for applying clock pulses simultaneously to one input of each of said input NAND gates; and
- means coupling said binary output of each of said binary stages except the highest order stage to an input of each of said input NAND gates associated with a higher order stage, and means coupling the output of each of said input NAND gates except the one coupled to the lowest order stage to said reset input means of all of said lower order binary stages.

2. The combination of claim 1 further including input circuit means having an input coupled to said clock input means and an output coupled to an input of all of said input NAND gates and operable to disable said input gates at a predetermined time following the beginning of each clock pulse.

3. The combination of claim 1 wherein said input circuit means includes first, second and third gates, with said first gate having an input coupled to said clock input means, an output coupled to said second gate, and said third gate having an output coupled to said input NAND gates and an input coupled to said second gate, and whereby said first, second and third gates operate in sequence to provide a disabling signal to said input gate.

4. The combination of claim 3 further including enabling means coupled to said third gate.

5. The combination of claim 1 further including a reset NAND gate having input means coupled to said clock input means and to said binary outputs of predetermined ones of said binary stages to determine the number at which the counter is reset, said reset NAND gate having an output coupled to said reset input means of said highest order stage.

6. The combination of claim 5 including further reset means selectively coupled to said set inputs and said reset input means of said binary stages and operative to reset the counter circuit at a particular binary number.

7. The combination of claim 1 wherein each of said binary stages includes a set NAND gate and a reset NAND gate, with said set gate having first and second set inputs and an output providing said binary output, and said reset NAND gate having a plurality of reset inputs and a reset output, one of said inputs of said reset gate being connected to said output of said set gate and said output of said reset gate being connected to one of said inputs of said set gate.

8. The combination of claim 1 further including means coupling said reset output of each binary stage except the highest order stage to one of said inputs of said input gate associated with such stage for disabling said input gate.

9. The combination of claim 1 including means coupling said output of each of said input NAND gates to one of said inputs of said other input gates, so that the first one of said input gates which is operated acts to disable the other ones of said input gates for the duration of the operation of said first input gate.

10. The combination of claim 9 further including input circuit means having an input coupled to said clock input means and an output coupled to one input of each of said input NAND gates, said input circuit means responding to clock pulses and acting to apply a disabling pulse to said input gates for disabling the same at a predetermined time after receipt of each clock pulse.

References Cited

UNITED STATES PATENTS

| | | | |
|---|---|---|---|
| 3,264,567 | 8/1966 | Prieto | 307—215 X |
| 3,345,574 | 10/1967 | Hilberg | 307—223 X |
| 3,349,332 | 10/1967 | Bleickardt | 328—42 |
| 3,517,318 | 6/1970 | McDermond | 328—42 |
| 3,631,350 | 12/1971 | Drake | 328—42 |
| 3,548,319 | 12/1970 | Price | 328—41 |

JOHN S. HEYMAN, Primary Examiner

U.S. Cl. X.R.

307—225, 215